US009284401B2

(12) United States Patent
Lorenz et al.

(10) Patent No.: US 9,284,401 B2
(45) Date of Patent: *Mar. 15, 2016

(54) PROCESS FOR THE PREPARATION OF POLYETHER-ESTER POLYOLS

(75) Inventors: Klaus Lorenz, Dormagen (DE); Reinhard Albers, Leverkusen (DE); Frank Otto, Hilden (DE); Ulrich Leyrer, Hilden (DE); Don S. Wardius, Pittsburgh, PA (US); Keith J. Headley, Paden City, WV (US)

(73) Assignees: Bayer MaterialScience LLC, Pittsburgh, PA (US); Bayer MaterialScience AG, Leverkusen (DE)

( * ) Notice: Subject to any disclaimer, the term of this patent is extended or adjusted under 35 U.S.C. 154(b) by 813 days.

This patent is subject to a terminal disclaimer.

(21) Appl. No.: 11/713,898

(22) Filed: Mar. 5, 2007

(65) Prior Publication Data
US 2008/0114086 A1    May 15, 2008

Related U.S. Application Data

(60) Provisional application No. 60/858,567, filed on Nov. 13, 2006.

(51) Int. Cl.
| | |
|---|---|
| *C08G 18/42* | (2006.01) |
| *C08G 18/46* | (2006.01) |
| *C08G 18/48* | (2006.01) |
| *C08G 18/50* | (2006.01) |
| *C08G 63/66* | (2006.01) |
| *C08G 63/87* | (2006.01) |
| *C08G 65/28* | (2006.01) |
| *C08G 65/332* | (2006.01) |
| *C08G 65/26* | (2006.01) |
| *C08G 18/08* | (2006.01) |
| *C08G 18/40* | (2006.01) |
| *C08G 101/00* | (2006.01) |

(52) U.S. Cl.
CPC ............ *C08G 18/4891* (2013.01); *C08G 18/14* (2013.01); *C08G 18/4018* (2013.01); *C08G 18/4244* (2013.01); *C08G 18/482* (2013.01); *C08G 18/4804* (2013.01); *C08G 18/5021* (2013.01); *C08G 18/5033* (2013.01); *C08G 63/66* (2013.01); *C08G 63/87* (2013.01); *C08G 65/2606* (2013.01); *C08G 65/2609* (2013.01); *C08G 65/2612* (2013.01); *C08G 65/2621* (2013.01); *C08G 65/2624* (2013.01); *C08G 65/2627* (2013.01); *C08G 65/2672* (2013.01); *C08G 65/2687* (2013.01); *C08G 65/3322* (2013.01); *C08G 2101/005* (2013.01); *C08G 2101/0025* (2013.01); *C08G 2101/0083* (2013.01)

(58) Field of Classification Search
USPC ............ 521/172; 528/76, 77, 78; 560/1, 129, 560/190; 568/623, 624

IPC .......... C08G 18/14,18/4244, 18/4891, 18/5021, C08G 18/5033, 63/66, 63/87, 65/2606, 65/2609, C08G 65/2612, 65/2621, 65/2624, 65/2672, C08G 65/2687, 65/3322, 2101/005, 2101/0025, C08G 2101/0083

See application file for complete search history.

(56) References Cited

U.S. PATENT DOCUMENTS

| | | | |
|---|---|---|---|
| 2,752,376 A | 6/1956 | Julian et al. .................... 260/405 |
| 4,332,936 A * | 6/1982 | Nodelman .................... 536/120 |
| 4,582,891 A | 4/1986 | Maki et al. | |
| 4,582,926 A | 4/1986 | Straehle et al. | |
| 4,826,944 A | 5/1989 | Hoefer et al. .................... 528/49 |
| 4,894,485 A * | 1/1990 | Behler et al. .................. 568/618 |
| 5,164,124 A * | 11/1992 | Lange et al. .................... 554/149 |
| 5,266,714 A | 11/1993 | Stoll et al. ................. 252/182.18 |
| 5,304,665 A * | 4/1994 | Cooper et al. ................ 554/149 |
| 5,399,728 A * | 3/1995 | Cooper .......................... 554/149 |
| 5,916,480 A | 6/1999 | Rotermund et al. ...... 252/182.24 |
| 6,107,433 A | 8/2000 | Petrovic et al. .................... 528/1 |
| 6,359,022 B1 | 3/2002 | Hickey et al. ................. 521/114 |
| 6,364,925 B1 | 4/2002 | Markusch et al. | |
| 6,420,443 B1 | 7/2002 | Clark et al. .................... 521/114 |
| 6,429,324 B1 | 8/2002 | Raths et al. | |
| 6,548,609 B2 | 4/2003 | Ramirez-de-Arellano-Aburto et al. ............................. 525/530 |
| 6,686,435 B1 | 2/2004 | Petrovic et al. ................. 528/44 |
| 8,716,515 B2 * | 5/2014 | Lorenz .............. C08G 18/1808 521/172 |
| 2003/0088054 A1 | 5/2003 | Chasar et al. ................. 528/405 |
| 2003/0191274 A1 | 10/2003 | Kurth et al. | |
| 2006/0122286 A1 | 6/2006 | O'Connor et al. ............ 521/155 |
| 2006/0122355 A1 | 6/2006 | O'Connor et al. .............. 528/44 |
| 2006/0167125 A1 | 7/2006 | Bauer et al. .................... 521/172 |
| 2006/0193802 A1 | 8/2006 | Lysenko et al. ................ 424/65 |

(Continued)

FOREIGN PATENT DOCUMENTS

| | | |
|---|---|---|
| CA | 2114874 | 8/1994 |
| CA | 2245670 | 8/1997 |

(Continued)

OTHER PUBLICATIONS

Merck's Warenlexicon, Klassische Warenkunde Von 1920, English Translation Attached.

(Continued)

*Primary Examiner* — Rabon Sergent
(74) *Attorney, Agent, or Firm* — Donald R. Palladino; Robert S. Klemz; Lydanne M. Whalen

(57) ABSTRACT

The present invention provides a process for the preparation of polyols based on fatty acid esters and starter compounds having Zerewitinoff-active hydrogen atoms and the use thereof for the preparation of polyurethane materials.

17 Claims, No Drawings

(56) References Cited

U.S. PATENT DOCUMENTS

| | | | |
|---|---|---|---|
| 2006/0241199 A1 | 10/2006 | O'Connor et al. | 521/172 |
| 2006/0276609 A1 | 12/2006 | Lysenko et al. | 528/44 |
| 2006/0293400 A1 | 12/2006 | Wiltz, Jr. et al. | 521/172 |

FOREIGN PATENT DOCUMENTS

| | | |
|---|---|---|
| CA | 2385085 | 3/2001 |
| DE | 33 23 880 C1 | 8/1984 |
| DE | 19812174 A1 | 9/1999 |
| DE | 199 36 481 A1 | 2/2001 |
| DE | 101 38 132 A1 | 2/2003 |
| JP | 05168892 A | 7/1993 |
| JP | 10167785 A | 6/1998 |
| JP | 2001178446 A | 7/2001 |
| WO | 9947581 A1 | 9/1999 |
| WO | WO 99/47581 * | 9/1999 |

OTHER PUBLICATIONS

Ionescu, Mihail; Chemistry and Technology of Polyols for Polyurethanes; first published in 2005 by Rapra Technology Limited; Shawbury, Shrewsbury, Shropshire, SY4 4NR, United Kingdom; pp. 371-373.

Ionescu, Mihail; Chemistry and Technology of Polyols for Polyurethanes; first published in 2005 by Rapra Technology Limited; Shawbury, Shrewsbury, Shropshire, SY4 4NR, United Kingdom; p. 326 and p. 334.

* cited by examiner

PROCESS FOR THE PREPARATION OF POLYETHER-ESTER POLYOLS

This application claims the benefit of U.S. Provisional Application No. 60/858,567, filed Nov. 13, 2006.

FIELD OF THE INVENTION

The present invention provides a process for the preparation of polyols based on fatty acid esters and starter compounds having active hydrogen atoms, and the use thereof in the preparation of polyurethane materials.

BACKGROUND OF THE INVENTION

Polyols based on regenerable raw materials, such as fatty acid triglycerides, sugar, sorbitol, glycerol and dimer fatty alcohols, are already used in diverse ways including as a raw material in the preparation of polyurethane materials. The use of such components will increase further in the future, because products made from renewable sources are rated advantageously in ecobalances and the availability of petrochemical-based raw materials will decrease in the long term.

An increased use of sugar, glycerol and sorbitol as well as oligo- or polysaccharides as the polyol component in polyurethane formulations on the one hand is complicated by their low solubility in or high incompatibility with other polyether or polyester polyols often employed in polyurethane chemistry, and on the other hand these substances impart adversely high OH numbers to the polyol component, even when employed in low amounts, because of their high density of hydroxyl groups.

Fatty acid triglycerides are obtained in a large amount from regenerable sources and therefore form an inexpensive basis for polyurethane raw materials. In rigid foam formulations specifically, this class of compound is distinguished by a high dissolving capacity for physical blowing agents based on hydrocarbons. A disadvantage is that only few fatty acid triglycerides have the reactive hydrogen atoms necessary for the reaction with isocyanates. Exceptions are castor oil and the rare lesquerella oil. However, the availability of castor oil is limited due to spatially restricted cultivation areas.

A further problem in the use of triglycerides in foam formulations is their incompatibility with other polyol components, in particular with polyether polyols.

Quite a number of workers in the art have proposed solutions to the problems described hereinabove.

DE-A 33 23 880 and WO 2004/20497 are concerned with the use of double metal cyanide complex catalysts in the preparation of alkylene oxide adducts based on starter components from regenerable sources with the aim of rendering these accessible to polyurethane chemistry. Castor oil is often employed as the preferred starter component, and oils modified subsequently with hydroxyl groups can also be used. According to the processes described, only relatively high molecular weight polyether polyols are accessible, and furthermore the triglycerides used, if castor oil is not employed, must be modified with hydroxyl groups in a separate reaction step.

According to U.S. Pat. No. 6,420,443, compatibilizers for blowing agents based on hydrocarbons are obtained by addition of alkylene oxide on to hydroxylated triglycerides. In a similar manner, DE-A 101 38 132 describes the use of OH adducts of castor oil or hydroxylated fatty acid compounds and alkylene oxides as hydrophobizing components in very flexible polyurethane systems.

The teaching of U.S. Pat. No. 6,686,435, EP-A 259 722, U.S. Pat. No. 6,548,609, US-A 2003/88054, U.S. Pat. No. 6,107,433, DE-A 36 30 624, U.S. Pat. No. 2,752,376, U.S. Pat. No. 6,686,435 and WO 91/05759 is ring-opening of epoxidized fatty acid derivatives and the use of the products obtained in polyurethane systems.

WO 2004/96744 discloses a process for the hydroxylation and hydroxymethylation of unsaturated fatty acid esters, further reaction thereof by transesterification to give branched condensates being the teaching in WO 2004/96882. The use of these condensates containing OH groups in flexible foam formulations can be seen from WO 2004/096883.

U.S. Pat. No. 6,359,022 discloses transesterification products of hydrophobic components, e.g. triglycerides, phthalic acid derivatives and polyols, as the OH component in rigid foam formulations which use alkanes as blowing agents. The polyether polyols optionally additionally employed in the polyol component must be prepared in a separate reaction step. EP-A 905 158 discloses blowing agent emulsifying aids for rigid foam formulations based on esterification or transesterification products of fatty acid derivatives and alcohols. The teaching of EP-A 610 714 is the preparation of hydrophobic rigid polyurethane foams by co-using esterification products of OH-functional fatty acid derivatives with low molecular weight polyols.

WO 200640333 and WO 200640335 disclose hydrophobically modified polysaccharides which are obtained by esterification with fatty acids, and the use thereof as components which increase the compressive strength in flexible foam formulations.

DE-A 196 04 177 describes the transesterification of castor oil or hydroxylated triglycerides with alkylene oxide addition products of polyfunctional starter alcohols and the use thereof as storage-stable components in the preparation of massive systems which cure without bubbles.

The teaching of DE-A 199 36 481 is the use of long-chain castor oil polyether-ols as components for the preparation of soundproofing flexible foams. The conditions of the preparation of the castor oil polyether-ols are not dealt with concretely.

DE-A 198 12 174 discloses the reaction of transesterification products of polyfunctional alcohols and triglycerides with alkylene oxides, and the transesterification of prefabricated polyether polyols with triglycerides in two-stage processes. According to the teaching of DE-A 198 12 174, it is also possible to interrupt the transesterification reaction, to add alkylene oxide, and then to continue the transesterification reaction. In DE-A 198 12 174, reaction conditions are employed in the preparation of the alkylene oxide addition products which lead to usable products only in the very specific cases described there by way of example; also, the alkaline polymers obtained are not worked up, as a result of which their usability is severely restricted further.

SUMMARY OF THE INVENTION

The present invention therefore, provides novel polyether-ester polyols which are based on regenerable raw materials and can be widely employed in polyurethane formulations as components which are reactive towards isocyanates. A simple process for the preparation of such polyols is also provided.

These and other advantages and benefits of the present invention will be apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages, OH numbers, functionalities and so forth in the specification are to be understood as being modified in all instances by the term "about." Equivalent weights and molecular weights given herein in Daltons (Da) are number average equivalent weights and number average molecular weights respectively, unless indicated otherwise.

The present invention provides a process for the preparation of a polyether-ester polyol involving reacting one or more starter compounds having Zerewitinoff-active hydrogen atoms with one or more alkylene oxides in the presence of a basic catalyst and in the presence of one or more fatty acid esters to produce a polyether-ester polyol.

The present invention also provides a polyether-ester polyol produced by a process involving reacting one or more starter compounds having Zerewitinoff-active hydrogen atoms with one or more alkylene oxides in the presence of a basic catalyst and in the presence of one or more fatty acid esters.

The present invention further provides a process for the preparation of a polyurethane foam or elastomer involving reacting a polyisocyanate with a polyether-ester polyol produced by a process involving reacting one or more starter compounds having Zerewitinoff-active hydrogen atoms with one or more alkylene oxides in the presence of a basic catalyst and in the presence of one or more fatty acid esters.

A simple one-pot one-step process has now been found with which polyether-ester polyols which are suitable for polyurethane uses can be obtained by addition of alkylene oxides from any type of fatty acid esters and starter compounds having Zerewitinoff-active hydrogen atoms.

The invention provides a process for the preparation of polyether-ester polyols, in which starter compounds having Zerewitinoff-active hydrogen atoms are reacted with alkylene oxides under base catalysis in the presence of fatty acid esters to give polyether-ester polyols.

In this context, a combination of the properties of low molecular weight polyols having a high density of OH groups and triglycerides is achieved, and furthermore the compatibility or miscibility of the two classes of substance with one another and with polyether polyols conventionally employed in polyurethane chemistry is improved.

The process according to the invention ensures that the triglycerides are incorporated completely into the polyether-ester polyols formed. The polyether-ester polyols prepared by the process according to the invention have OH numbers in the range of from 25 to 700 mg KOH/g.

The polyether-ester polyols according to the invention impart to rigid foam formulations an improved dissolving capacity for blowing agents based on hydrocarbons, and their use in polyurethane formulations has the effect of favorable mold release properties of the foams produced.

The present invention also provides the polyether-ester polyols prepared by the process according to the invention and the use thereof in polyurethanes.

Suitable starter compounds having Zerewitinoff-active hydrogen atoms usually have functionalities of from 2 to 8, but in certain cases also functionalities of up to 35. Their molar masses are from 60 g/mol to 1,200 g/mol. In addition to hydroxy-functional starter compounds, amino-functional starter compounds can also be employed. Preferred starter compounds have functionalities of greater than or equal to 3. Examples of hydroxy-functional starter compounds are propylene glycol, ethylene glycol, diethylene glycol, dipropylene glycol, 1,2-butanediol, 1,3-butanediol, 1,4-butanediol, hexanediol, pentanediol, 3-methyl-1,5-pentanediol, 1,12-dodecanediol, glycerol, trimethylolpropane, trimethylolethane, triethanolamine, pentaerythritol, sorbitol, sucrose, α-methyl glucoside, fructose, hydroquinone, pyrocatechol, resorcinol, bisphenol F, bisphenol A, 1,3,5-trihydroxybenzene, condensates of formaldehyde and phenol or melamine or urea containing methylol groups, and Mannich bases. Highly functional starter compounds based on hydrogenated starch hydrolysis products can also be employed. Such compounds are described, for example, in EP-A 1 525 244. Examples of starter compounds containing amino groups are ammonia, ethanolamine, diethanolamine, isopropanolamine, diisopropanolamine, ethylenediamine, hexamethylenediamine, aniline, the isomers of toluidine, the isomers of diaminotoluene, the isomers of diaminodiphenylmethane and products having a relatively high ring content obtained in the condensation of aniline with formaldehyde to give diaminodiphenylmethane. Ring-opening products from cyclic carboxylic acid anhydrides and polyols can moreover also be employed as starter compounds. Examples are ring-opening products from phthalic anhydride, succinic anhydride and maleic anhydride on the one hand and ethylene glycol, diethylene glycol, 1,2-butanediol, 1,3-butanediol, 1,4-butanediol, hexanediol, pentanediol, 3-methyl-1,5-pentanediol, 1,12-dodecanediol, glycerol, trimethylolpropane, pentaerythritol or sorbitol on the other hand. Mixtures of various starter compounds can of course also be employed.

Prefabricated alkylene oxide addition products of the starter compounds mentioned, that is to say polyether polyols having OH numbers of from 6 to 800 mg KOH/g, can furthermore also be added to the process. It is also possible also to employ polyester polyols having OH numbers in the range of from 6 to 800 mg KOH/g in the process according to the invention, alongside the starter compounds. Polyester polyols which are suitable for this can be prepared, for example, from organic dicarboxylic acids having 2 to 12 carbon atoms and polyhydric alcohols, preferably diols, having 2 to 12 carbon atoms, preferably 2 to 6 carbon atoms.

Suitable alkylene oxides are, for example, ethylene oxide, propylene oxide, 1,2-butylene oxide or 2,3-butylene oxide and styrene oxide. Preferably, propylene oxide and ethylene oxide are added to the reaction mixture individually, in a mixture or successively. If the alkylene oxides are metered in successively, the products prepared contain polyether chains having block structures. Products with ethylene oxide end blocks are characterized, for example, by increased concentrations of primary end groups which impart to the systems the isocyanate reactivity necessary for molded foam uses.

The generic term "fatty acid esters" in the following describes fatty acid glycerides, in particular fatty acid triglycerides, and/or fatty acid esters based on other mono- and polyfunctional alcohols. The fatty acid radicals of the fatty acid esters can in their turn, as in the case of castor oil, carry hydroxyl groups. It is of course also possible to employ in the process according to the invention fatty acid esters, the fatty acid radicals of which have been modified subsequently with hydroxyl groups. Fatty acid radicals modified in this way can be obtained, for example, by epoxidation of the olefinic double bonds and subsequent ring-opening of the oxirane rings by means of nucleophiles or by hydroformylation/hydrogenation. Unsaturated oils are often also treated with atmospheric oxygen at elevated temperature for this purpose.

All triglycerides are suitable as substrates for the processes according to the invention. There may be mentioned by way of example cottonseed oil, groundnut oil, coconut oil, linseed oil, palm kernel oil, olive oil, maize-oil, palm oil, castor oil, lesquerella oil, rapeseed oil, soya oil, sunflower oil, herring oil, sardine oil, tallow and lard. Fatty acid esters of other mono- or polyfunctional alcohols and fatty acid glycerides having less than 3 fatty acid radicals per glycerol molecule can of course also be employed in the process according to the invention. The fatty acid (tri)glycerides and the fatty acid esters of other mono- and polyfunctional alcohols can also be employed in the mixture.

At this point it is to be emphasized that the process according to the invention is very particularly suitable also for converting fatty acid esters without OH groups in the fatty acid radicals, such as, for example, fatty acid esters based on lauric myristic, palmitic, stearic, palmitoleic, oleic, erucic, linoleic, linolenic elaeostearic or arachidonic acid or mixtures thereof, into the desired polyether-esters.

The fatty acid esters are employed in the preparation of the polyether-ester polyols according to the invention in amounts of from 5 to 85 wt. %, preferably 20 to 60 wt. %, based on the amount of end product.

In one embodiment of the invention, an alkali metal or alkaline earth metal hydroxide, preferably potassium hydroxide, is used as the basic catalyst. The catalyst can be added to the reaction mixture in the form of aqueous solutions or in anhydrous form. Preferably, any water of solution present or water formed by the deprotonation of the OH groups is removed before the addition of the fatty acid esters to the reaction mixture. The dehydration can be carried out, for example, by heat treatment under reduced pressure at temperatures of from 80 to 150° C. and can optionally be assisted by stripping with inert gas. Residual traces of water can finally be removed from the reaction mixture by reaction with small amounts of alkylene oxide before addition of the fatty acid esters. As a rule, 5 wt. % of alkylene oxide, based on the total amount of reaction mixture contained in the reactor, is sufficient for this. The catalyst concentration is 0.02 to 1 wt. %, based on the amount of end product, and 0.05 to 0.6 wt. % is preferably employed. If end products having OH numbers of greater than 200 mg KOH/g are desired, the removal of water before the addition of the fatty acid ester can also be omitted.

In another embodiment of the invention, alkylene oxide addition products of hydroxy-functional starter compounds having alkoxylate contents of from 0.05 to 50 equivalent % ("polymeric alkoxylates") are employed as the basic catalysts. Alkoxylate content is to be understood as meaning the content of Zerewitinoff-active hydrogen atoms removed by a base by deprotonation out of all the Zerewitinoff-active hydrogen atoms in the catalyst.

The polymeric alkoxylate employed as the catalyst can be prepared in a separate reaction step by alkali-catalyzed addition of alkylene oxides on to the starter compounds having Zerewitinoff-active hydrogen atoms already mentioned above. Conventionally, an alkali metal or alkaline earth metal hydroxide, e.g. KOH, is employed as the catalyst in the preparation of the polymeric alkoxylate in amounts of from 0.1 to 1 wt. %, based on the amount to be prepared, the reaction mixture is dehydrated in vacuo, the alkylene oxide addition reaction is carried out under an inert gas atmosphere at 100 to 150° C. until an OH number of from 150 to 1,200 mg KOH/g is reached, and thereafter the product is adjusted to the abovementioned alkoxylate contents of from 0.05 to 50 equivalent % by addition of further alkali metal or alkaline earth metal hydroxide and subsequent dehydration. Polymeric alkoxylates prepared in such a way can be stored separately under an inert gas atmosphere. They have already been employed for a long time in the preparation of long-chain polyether polyols. The amount of polymeric alkoxylate employed in the process according to the invention is conventionally chosen such that it corresponds to an amount of alkali metal or alkaline earth metal hydroxide, based on the end product according to the invention, of from 200 ppm to 1 wt. %. The polymeric alkoxylates can of course also be employed as mixtures.

The polymeric alkoxylates can also be prepared in situ in the same reactor directly before the process according to the invention is carried out. In this case, the amount of polymeric alkoxylate necessary for a polymerization batch is prepared in the reactor by the procedure described in the preceding paragraph. In this procedure it is of course to be ensured that the extremely low amounts of starter compound can also be stirred at the start of the reaction. This can be achieved, if appropriate, by the use of inert solvents, such as toluene and/or THF.

In a third embodiment of the invention, aliphatic or aromatic amines are employed as basic catalysts. Amines which can be employed as catalysts are, for example, aliphatic amines or alkanolamines, such as N,N-dimethylbenzylamine, dimethylaminoethanol, dimethylaminopropanol, N-methyldiethanolamine, trimethylamine, N,N-dimethylcyclohexylamine, N-methylpyrrolidine, N,N,N',N'-tetramethylethylenediamine, diazabicyclo[2,2,2]octane, 1,4,dimethylpiperazine or N-methylmorpholine. Aromatic amines, such as imidazole and alkyl-substituted imidazole derivatives, N,N-dimethylaniline, 4-(N,N-dimethyl)aminopyridine and partly crosslinked copolymers of 4-vinylpyridine or vinylimidazole and divinylbenzene, are also readily usable. A comprehensive overview of amines which can be used has been given by M. Ionescu et. al. in "Advances in Urethanes Science and Technology", 1998, 14, 151-218. Preferably, tertiary aliphatic amines or alkanolamines are employed, as well as imidazole and the imidazole or pyridine derivatives mentioned. The catalysts can be employed in concentrations of from 200 ppm to 10,000 ppm, based on the amount of end product, and the concentration range of from 200 ppm to 5,000 ppm is preferred.

In a fourth embodiment of the invention, carboxylic acid salts of alkali metals or alkaline earth metals are employed as basic catalysts. The carboxylic acids on which they are based can be mono- or polybasic. Examples are salts of acetic, propionic and adipic acid. The carboxylates are conventionally employed in amounts of from 0.04 to 2 wt. %, based on the amount of end product.

The process according to the invention is carried out in detail as follows: The low molecular weight starter compounds, catalyst(s) and finally fatty acid esters are initially introduced into the reactor and are reacted with alkylene oxides under an inert gas atmosphere at temperatures of 80-170° C., preferably 100-150° C. (80-150° C. if amine catalysts are used), the alkylene oxides being fed continuously to the reactor in the usual manner such that the safety pressure limits of the reactor system used are not exceeded. Such reactions are conventionally carried out in the pressure range of from 10 mbar to 10 bar. After the end of the alkylene oxide metering phase, an after-reaction phase conventionally follows, in which residual alkylene oxide reacts. The end of the after-reaction phase is reached when no further drop in pressure can be detected in the reaction tank. In order to exclude the presence of water with certainty, dehydration can also be carried out in vacuo at temperatures of 80-150° C. (40-130° C. if amine catalysts are used), optionally by additional stripping with inert gas, before the addition of the fatty acid esters. If amines are used as catalysts, these can also first be added after such a dehydration step. It is also possible first to prelengthen the starter compounds by polymerizing on a certain amount of alkylene oxide before the addition of the fatty acid esters. If the starter compounds are merely to be freed from traces of water by the prior metering of alkylene oxide, 5 wt. % of alkylene oxide, based on the contents of the reactor, is in general sufficient.

If aminic catalysts are employed, these are usually left in the end product. If other catalysts are employed, working up of the reaction products obtained is necessary to arrive at the polyether-ester polyols according to the invention.

Working up of the polyether-ester polios according to the invention is carried out in the conventional manner by neutralization of the alkoxylate end groups with approximately stoichiometric amounts of strong dilute mineral acids, such as, for example, phosphoric acid, sulfuric acid or hydrochloric acid, or with carboxylic acids. In this case, the latter are also used in more than stoichiometric amounts. Working up using adsorption agents is also possible, as described e.g. in WO 2003/106535. It is furthermore possible, as demonstrated, for example, in WO 2001/10880 or DE-A 34 01 780, to carry out the working up by means of ion exchange on acid cation exchangers.

If neutralization is carried out using strong dilute mineral acids (pKa of the 1st dissociation stage <2.8), the neutralization should be carried out at relatively low temperatures, for example at 20 to 80° C., preferably at 20-60° C., and the amount of acid necessary for the neutralization should be added to the alkaline alkylene oxide addition product as rapidly as possible, so that the basic reaction products are simultaneously hydrolyzed and neutralized. It is thus advisable to dispense with a separate hydrolysis step before the addition of the neutralization acid. With such a procedure, secondary reactions on the ester bonds of the polyether-ester polyols are largely ruled out. After the water has been distilled off, the alkaline earth metal or alkali metal salts of the strong mineral acids which have precipitated out are conventionally separated off by filtration. The salt-containing aqueous phase can also be separated off from the polyether-ester polyol by phase separation processes. The use of adsorption agents is of advantage especially in the preparation of small (pilot) amounts of the products according to the invention. They must likewise be separated off from the end product by filtration. If carboxylic acids, such as, for example, lactic acid, are used, possibly soluble alkali metal salts may be obtained in the polyol, which can remain in the product provided that the intended use of the polyether-ester polyol tolerates the presence of the alkali metal carboxylates.

The polyether-ester polyols obtainable by the process according to the invention can be employed as starting components for the preparation of massive or foamed polyurethane materials and of polyurethane elastomers. The polyurethane materials and elastomers can also contain isocyanurate, allophanate and biuret structural units.

For the preparation of these materials
A. the polyether-ester polyols according to the invention are optionally mixed with further isocyanate-reactive components and are reacted with
B. organic polyisocyanates,
C. optionally in the presence of blowing agents,
D. in the presence of catalysts
E. optionally in the presence of other additives, such as e.g. cell stabilizers.

Polyether polyols, polyester polyols, polycarbonate polyols, polyether-carbonate polyols, polyester-carbonate polyols, polyether-ester-carbonate polyols and/or low molecular weight chain-lengthening and/or crosslinking agents having OH numbers or NH numbers of from 6 to 1,870 mg KOH/g can optionally be admixed to the polyether-ester polyols according to the invention as further isocyanate-reactive components.

Polyether polyols which are suitable for this can be obtained, for example, by anionic polymerization of alkylene oxides in the presence of alkali metal hydroxides or alkali metal alcoholates as catalysts and with the addition of at least one starter molecule which contains 2 to 8 bonded Zerewitinoff-active hydrogen atoms, or by cationic polymerization of alkylene oxides in the presence of Lewis acids, such as antimony pentachloride or boron fluoride etherate. Suitable catalysts are of course also those of the double metal cyanide complex types, such as are described, for example, in U.S. Pat. No. 3,404,109, U.S. Pat. No. 3,829,505, U.S. Pat. No. 3,941,849, U.S. Pat. No. 5,158,922, U.S. Pat. No. 5,470,813, EP-A 700 949, EP-A 743 093, EP-A 761 708, WO 97/40086, WO 98/16310 and WO 00/47649. Suitable alkylene oxides and some suitable starter compounds have already been described in preceding sections. There is to be mentioned in addition tetrahydrofuran as a cyclic ether which can be polymerized under Lewis acid conditions and water as a starter molecule. The polyether polyols, preferably polyoxypropylene-polyoxyethylene polyols, preferably have number-average molar masses of from 200 to 8,000 Da. Suitable polyether polyols are furthermore polymer-modified polyether polyols, preferably graft polyether polyols, in particular those based on styrene and/or acrylonitrile, which are prepared by in situ polymerization of acrylonitrile, styrene or preferably mixtures of styrene and acrylonitrile, e.g. in the weight ratio of 90:10 to 10:90, preferably 70:30 to 30:70, expediently in the abovementioned polyether polyols, and polyether polyol dispersions which comprise as the disperse phase, conventionally in an amount of from 1 to 50 wt. %, preferably 2 to 25 wt. %, inorganic fillers, polyureas, polyhydrazides, polyurethanes containing bonded tertiary amino groups and/or melamine.

Suitable polyester polyols can be prepared, for example, from organic dicarboxylic acids having 2 to 12 carbon atoms and polyhydric alcohols, preferably diols, having 2 to 12 carbon atoms, preferably 2 to 6 carbon atoms. Possible dicarboxylic acids are, for example: succinic acid, glutaric acid, adipic acid, suberic acid, azelaic acid, sebacic acid, decanedicarboxylic acid, dodecanedicarboxylic acid, maleic acid, fumaric acid, phthalic acid, isophthalic acid and terephthalic acid. In this context, the dicarboxylic acids can be used either individually or in a mixture with one another. Instead of the free dicarboxylic acids, it is also possible to employ the corresponding dicarboxylic acid derivatives, such as e.g. dicarboxylic acid mono and/or diesters of alcohols having 1 to 4 carbon atoms or dicarboxylic acid anhydrides. Dicarboxylic acid mixtures of succinic, glutaric and adipic acid in ratios of amounts of, for example, 20 to 35/40 to 60/20 to 36 parts by wt., and in particular adipic acid are preferably used. Examples of di- and polyhydric alcohols are ethanediol, diethylene glycol, 1,2- and 1,3-propanediol, dipropylene glycol, methyl-1,3-propanediol, 1,4-butanediol, 1,5-pentanediol, 3-methyl-1,5-pentanediol, 1,6-hexanediol, neopentylglycol, 1,10-decanediol, 1,12-dodecanediol, glycerol, trimethylolpropane and pentaerythritol. 1,2-Ethanediol, diethylene glycol, 1,4-butanediol, 1,6-hexanediol, glycerol, trimethylolpropane or mixtures of at least two of the polyhydric alcohols mentioned, in particular mixtures of ethanediol, 1,4-butanediol and 1,6-hexanediol, glycerol and/or trimethylolpropane, are preferably used. Polyester polyols from lactones, e.g. ε-caprolactone, or hydroxycarboxylic acids, e.g. hydroxycaproic acid and hydroxyacetic acid, can furthermore be employed.

For preparation of the polyester polyols, the organic, aromatic or aliphatic polycarboxylic acids and/or polycarboxylic acid derivatives and polyhydric alcohols can be subjected to polycondensation without a catalyst or in the presence of esterification catalysts, expediently in an atmosphere of inert gases, such as e.g. nitrogen, helium or argon, and also in the melt at temperatures of from 150 to 300° C., preferably 180 to 230° C., optionally under reduced pressure, until the desired acid and OH numbers are reached. The acid number is advantageously less than 10, preferably less than 2.5.

In a preferred preparation process, the esterification mixture is subjected to polycondensation at the abovementioned temperatures under normal pressure and then under a pressure of less than 500 mbar, preferably 1 to 150 mbar, to an acid number of from 80 to 30, preferably 40 to 30. Possible esterification catalysts are, for example, iron, cadmium, cobalt, lead, zinc, antimony, magnesium, titanium and tin catalysts in the form of metals, metal oxides or metal salts. However, the polycondensation of aromatic or aliphatic carboxylic acids with polyhydric alcohols can also be carried out in a liquid phase in the presence of diluents and/or entraining agents, such as e.g. benzene, toluene, xylene or chlorobenzene, for removal of the water of condensation by azeotropic distillation.

The ratio of dicarboxylic acid (derivative) and polyhydric alcohol to be chosen to obtain a desired OH number, functionality and viscosity and the alcohol functionality to be chosen can be determined in a simple manner by the person skilled in the art.

Suitable polycarbonate polyols are those of the type known per se, which can be prepared, for example, by reaction of diols, such as 1,2-propanediol, 1,4-butanediol, 1,6-hexanediol, diethylene glycol, triethylene glycol, tetraethylene glycol oligo-tetramethylene glycol and/or oligo-hexamethylene glycol, with diaryl carbonates and/or dialkyl carbonates, e.g. diphenyl carbonate, dimethyl carbonate and α-ω-bis-chloroformates or phosgene.

Low molecular weight difunctional chain-lengthening agents and/or low molecular weight, preferably tri- or tetrafunctional crosslinking agents can be admixed to the polyether-ester polyols to be employed according to the invention for modification of the mechanical properties, in particular the hardness of the polyurethane materials. Suitable chain-lengthening agents, such as alkanediols, dialkylene glycols and polyalkylene polyols, and crosslinking agents, e.g. 3- or 4-hydric alcohols and oligomeric polyalkylene polyols having a functionality of 3 to 4, conventionally have molecular weights of <800, preferably of from 18 to 400 and in particular from 60 to 300 Da. Chain-lengthening agents which are preferably used are alkanediols having 2 to 12 carbon atoms, e.g. ethanediol, 1,3-propanediol, 1,5-pentanediol, 1,6-hexanediol, 1,7-heptanediol, 1,8-octanediol, 1,9-nonanediol, 1,10-decanediol and, in particular, 1,4-butanediol, and dialkylene glycols having 4 to 8 carbon atoms, e.g. diethylene glycol and dipropylene glycol, as well as polyoxyalkylene glycols. Branched-chain and/or unsaturated alkanediols having conventionally not more than 12 carbon atoms, such as e.g. 1,2-propanediol, 2-methyl-1,3-propanediol, 3-methyl-1,5-pentanediol, 2,2-dimethyl-1,3-propanediol, 2-butyl-2-ethyl-1,3-propanediol, 2-butene-1,4-diol and 2-butyne-1,4-diol, diesters of terephthalic acid with glycols having 2 to 4 carbon atoms, such as e.g. terephthalic acid bis-ethylene glycol ester or terephthalic acid bis-1,4-butylene glycol ester, and hydroxyalkylene ethers of hydroquinone or resorcinol, e.g. 1,4-di-(β-hydroxyethyl)-hydroquinone or 1,3-(β-hydroxyethyl)-resorcinol, are also suitable. Alkanolamines having 2 to 12 carbon atoms, such as ethanolamine, 2-aminopropanol and 3-amino-2,2-dimethylpropanol, N-alkyldialkanolamines, e.g. N-methyl- and N-ethyl-diethanolamine, (cyclo)aliphatic diamines having 2 to 15 carbon atoms, such as 1,2-ethylenediamine, 1,3-propylenediamine, 1,4-butylenediamine and 1,6-hexamethylenediamine, isophoronediamine, 1,4-cyclohexamethylenediamine and 4,4'-diaminodicyclohexylmethane, and N-alkyl- and N,N'-di-alkyl-substituted and aromatic diamines, which can also be substituted by alkyl groups on the aromatic radical, having 1 to 20, preferably 1 to 4 carbon atoms in the N-alkyl radical, such as N,N'-diethyl-, N,N'-di-sec-pentyl-, N,N'-di-sec-hexyl-, N,N'-di-sec-decyl- and N,N'-dicyclohexyl- or p- or m-phenylenediamine, N,N'-dimethyl-, N,N'-diethyl-, N,N'-diisopropyl-, N,N'-di-sec-butyl- or N,N'-dicyclohexyl-4,4'-diamino-diphenylmethane, N,N'-di-sec-butylbenzidine, methylene-bis(4-amino-3-benzoic acid methyl ester), 2,4-chloro-4,4'-diamino-diphenylmethane and 2,4- and 2,6-toluylenediamine, can also be used. Suitable crosslinking agents are, for example, glycerol, trimethylolpropane or pentaerythritol.

Mixtures of various chain-lengthening and crosslinking agents with one another and mixtures of chain-lengthening and crosslinking agents can also be used. Suitable organic polyisocyanates are cycloaliphatic, araliphatic, aromatic and heterocyclic polyisocyanates, such as are described e.g. by W. Siefken in Justus Liebigs Annalen der Chemie, 562, pages 75 to 136, for example those of the formula Q(NCO)$_n$, in which n=2-4, preferably 2, and Q denote an aliphatic hydrocarbon radical having 2-18, preferably 6-10 Carbon atoms, a cycloaliphatic hydrocarbon radical having 4-15, preferably 5-10 Carbon atoms, an aromatic hydrocarbon radical having 6-15, preferably 6-13 Carbon atoms, or an araliphatic hydrocarbon radical having 8-15, preferably 8-13 Carbon atoms. Suitable compounds are e.g. ethylene-diisocyanate, 1,4-tetramethylene-diisocyanate, 1,6-hexamethylene-diisocyanate (HDI), 1,12-dodecane-diisocyanate, cyclobutane-1,3-diisocyanate, cyclohexane-1,3- and -1,4-diisocyanate and any desired mixtures of these isomers, 1-isocyanato-3,3,5-trimethyl-5-isocyanatomethyl-cyclohexane (DE-B 1 202 785, U.S. Pat. No. 3,401,190), 2,4- and 2,6-hexahydrotoluylene-diisocyanate and any desired mixtures of these isomers, hexahydro-1,3- and -1,4-phenylene-diisocyanate, perhydro-2,4'- and -4,4'-diphenylmethane-diisocyanate, 1,3- and 1,4-phenylene-diisocyanate (DE-A 196 27 907), 1,4-durol-diisocyanate (DDI), 4,4'-stilbene-diisocyanate (DE-A 196 28 145), 3,3'-dimethyl-4,4'-biphenylene-diisocyanate (DIBDI) (DE-A 195 09 819) 2,4- and 2,6-toluylene-diisocyanate (TDI) and any desired mixtures of these isomers, diphenylmethane-2,4'-diisocyanate and/or diphenylmethane-4,4'-diisocyanate (MDI) or naphthylene-1,5-diisocyanate (NDI).

Further examples which are possible according to the invention are: triphenylmethane-4,4',4"-triisocyanate, polyphenyl-polymethylene polyisocyanates, such as are obtained by aniline-formaldehyde condensation and subsequent phosgenation and are described e.g. in GB-A 874 430 and GB-A 848 671, m- and p-isocyanatophenylsulfonyl isocyanates according to U.S. Pat. No. 3,454,606, perchlorinated aryl polyisocyanates, such as are described in U.S. Pat. No. 3,277,138, polyisocyanates containing carbodiimide groups, such as are described in U.S. Pat. No. 3,152,162 and in DE-A 25 04 400, 25 37 685 and 25 52 350, norbornane-diisocyanates according to U.S. Pat. No. 3,492,301, polyisocyanates containing allophanate groups, such as are described in GB-A 994 890, BE-B 761 626 and NL-A 7 102 524, polyisocyanates containing isocyanurate groups, such as are described in U.S. Pat. No. 3,001,9731, in DE-C 10 22 789, 12 22 067 and 1 027 394 and in DE-A 1 929 034 and 2 004 048, polyisocyanates containing urethane groups, such as are described e.g. in BE-B 752 261 or in U.S. Pat. Nos. 3,394,164 and 3,644,457, polyisocyanates containing acylated urea groups according to DE-C 1 230 778, polyisocyanates containing biuret groups, such as are described in U.S. Pat. Nos. 3,124,605, 3,201,372 and 3,124,605 and in GB-B 889 050, polyisocyanates prepared by telomerization reactions, such as are described in U.S. Pat. No. 3,654,106, polyisocyanates containing ester groups, such as are mentioned in GB-B 965 474 and 1 072 956, in U.S. Pat. No. 3,567,763 and in DE-C 12 31 688, reaction products of the abovementioned isocyanates with acetals according to DE-C 1 072 385, and polyisocyanates containing polymeric fatty acid esters according to U.S. Pat. No. 3,455,883.

It is also possible to employ the distillation residues which are obtained in the industrial preparation of isocyanates and contain isocyanate groups, optionally dissolved in one or more of the abovementioned polyisocyanates. It is furthermore possible to use any desired mixtures of the abovementioned polyisocyanates.

The polyisocyanates which are readily accessible industrially are preferably employed, e.g. 2,4- and 2,6-toluylene-diisocyanate and any desired mixtures of these isomers ("TDI"), polyphenyl-polymethylene polyisocyanates, such as are prepared by aniline-formaldehyde condensation and subsequent phosgenation ("crude MDI") and polyisocyanates containing carbodiimide groups, urethane groups, allophanate groups, isocyanurate groups, urea groups or biuret groups ("modified polyisocyanates"), in particular those modified polyisocyanates which are derived from 2,4- and/or 2,6-toluylene-diisocyanate or from 4,4'- and/or 2,4'-diphenylmethane-diisocyanate. Naphthylene-1,5-diisocyanate and mixtures of the polyisocyanates mentioned are also particularly suitable.

Prepolymers containing isocyanate groups which are obtainable by reaction of a part or the total amount of the polyether-ester polyols to be employed according to the invention and/or a part or the total amount of the isocyanate-reactive components which are described above and are optionally to be admixed to the polyether-ester polyols to be employed according to the invention with at least one aromatic di- or polyisocyanate from the group consisting of TDI, MDI, DIBDI, NDI and DDI, preferably with 4,4'-MDI and/or 2,4-TDI and/or 1,5-NDI, to give a polyaddition product containing urethane groups, preferably urethane groups and isocyanate groups, can also be used. Such polyaddition products have NCO contents of from 0.05 to 40.0 wt. %. According to an embodiment which is preferably used, the prepolymers containing isocyanate groups are prepared by reaction of exclusively higher molecular weight polyhydroxy compounds, that is to say the polyether-ester polyols to be employed according to the invention and/or polyether polyols, polyester polyols or polycarbonate polyols, with the polyisocyanates, preferably 4,4'-MDI, 2,4-TDI and/or 1,5-NDI.

The prepolymers containing isocyanate groups can be prepared in the presence of catalysts. However, it is also possible to prepare the prepolymers containing isocyanate groups in the absence of catalysts and to add these to the reaction mixture for the preparation of the polyurethane materials.

Water can be used as the blowing agent optionally to be employed, the water reacting in situ with the organic polyisocyanates or with the prepolymers containing isocyanate groups to form carbon dioxide and amino groups, which in turn react further with further isocyanate groups to give urea groups and act as chain-lengthening agents. If water is added to the polyurethane formulation to establish the desired density, this is conventionally used in amounts of from 0.001 to 6.0 wt. %, based on the weight of components A, D and E.

Instead of water, or preferably in combination with water, it is also possible to employ as blowing agents gases or readily volatile inorganic or organic substances which vaporize under the influence of the exothermic polyaddition reaction and advantageously have a boiling point under normal pressure in the range of from −40 to 120° C., preferably from 10 to 90° C., as physical blowing agents. Organic blowing agents which can be used are e.g. acetone, ethyl acetate, methyl acetate, halogen-substituted alkanes, such as methylene chloride, chloroform, ethylidene chloride, vinylidene chloride, monofluorotrichloromethane, chlorodifluoromethane, dichlorodifluoromethane and HFCs, such as R-134a, R-245fa and R-365mfc, and furthermore unsubstituted alkanes, such as butane, n-pentane, isopentane, cyclopentane, hexane, heptane or diethyl ether. Possible inorganic blowing agents are e.g. air, $CO_2$ or $N_2O$. A blowing action can also be achieved by addition of compounds which decompose at temperatures above room temperature with gases being split off, for example nitrogen and/or carbon dioxide, such as azo compounds, e.g. azodicarboxamide or azoisobutyric acid nitrile, or salts, such as ammonium bicarbonate, ammonium carbamate or ammonium salts of organic carboxylic acids, e.g. the monoammonium salts of malonic acid, boric acid, formic acid or acetic acid. Further examples of blowing agents, details of the use of blowing agents and criteria for the choice of blowing agents are described in R. Vieweg, A. Hoichtlen (eds.): "Kunststoff-Handbuch", volume VII, Carl-Hanser-Verlag, Munich 1966, p. 108f, 453ff and 507-510 and in D. Randall, S. Lee (eds.): "The Polyurethanes Book", John Wiley & Sons, Ltd., London 2002, p. 127-136, p 232-233 and p. 261.

The amount advantageously to be employed of solid blowing agents, low-boiling liquids or gases, each of which can be employed individually or in the form of mixtures, e.g. as liquid or gas mixtures or as gas-liquid mixtures, depends on the density aimed for in the polyurethane material and the amount of water employed. The amounts required can be determined by experiment. Amounts of solid of from 0.5 to 35 parts by wt., preferably 2 to 15 parts by wt., amounts of liquid of from 1 to 30 parts by wt., preferably from 3 to 18 parts by wt. and/or amounts of gas of from 0.01 to 80 parts by wt., preferably from 10 to 35 parts by wt., in each case based on the weight of builder components A and B, deliver satisfactory results. The gas loading with e.g. air, carbon dioxide, nitrogen and/or helium can take place either via formulation components A, D and E or via the polyisocyanates B or via A, D, E on the one hand and B on the other hand.

Amine catalysts familiar to the person skilled in the art can be employed as component D, e.g. tertiary amines, such as triethylamine, tributylamine, N-methyl-morpholine, N-ethyl-morpholine, N,N,N',N'-tetramethyl-ethylenediamine, pentamethyl-diethylene-triamine and higher homologues (DE-OS 26 24 527 and 26 24 528), 1,4-diaza-bicyclo-(2,2,2)-octane, N-methyl-N'-dimethylaminoethyl-piperazine, bis-(dimethylaminoalkyl)-piperazines (DE-A 26 36 787), N,N-dimethylbenzylamine, N,N-dimethylcyclohexylamine, N,N-diethylbenzylamine, bis-(N,N-diethylaminoethyl) adipate, N,N,N',N'-tetramethyl-1,3-butanediamine, N,N-dimethyl-p-phenyl-ethyl-amine, bis-(dimethylaminopropyl)-urea, 1,2-dimethylimidazole, 2-methylimidazole, monocyclic and bicyclic amidines (DE-A 17 20 633), bis-(dialkylamino)-alkyl ethers (U.S. Pat. No. 3,330,782, DE-B 10 30 558, DE-A 18 04 361 and 26 18 280) and tertiary amines containing amide groups (preferably formamide groups) according to DE-A 25 23 633 and 27 32 292). Mannich bases, which are known per se, from secondary amines, such as dimethylamine, and aldehydes, preferably formaldehyde, or ketones, such as acetone, methyl ethyl ketone or cyclohexanone, and phenols, such as phenol or alkyl-substituted phenols, are also possible catalysts. Tertiary amines, as the catalyst, which contain hydrogen atoms which are active towards isocyanate groups are e.g. triethanolamine, triisopropanolamine, N-methyl-diethanolamine, N-ethyl-diethanolamine, N,N-dimethyl-ethanolamine, reaction products thereof with alkylene oxides, such as propylene oxide and/or ethylene oxide, and secondary-tertiary amines according to DE-A 27 32 292. Sila-amines having carbon-silicon bonds, such as are described in U.S. Pat. No. 3,620,984, can furthermore be employed as catalysts, e.g. 2,2,4-trimethyl-2-silamorpholine and 1,3-diethyl-aminomethyl-tetramethyl-disiloxane. Nitrogen-containing bases, such as tetraalkylammonium hydroxides, and furthermore hexahydrotriazines, are moreover also possible. The reaction between NCO groups and Zerewitinoff-active hydrogen atoms is also greatly accelerated by lactams and azalactams, an associate between the lactam and the compound with acidic hydrogen first being formed.

If amines are employed as catalysts for the catalysis of the polyurethane reaction, it is of course to be remembered that polyether-ester polyols prepared according to the invention under amine catalysis already optionally contain catalytically active amines. However, it is possible for the person skilled in the art to determine by suitable series of experiments in the amounts of amine catalysts optionally also to be added.

Conventional organometallic compounds can moreover be employed as catalysts for this purpose, preferably organotin compounds, such as tin(II) salts of organic carboxylic acids, e.g. tin(II) acetate, tin(II) octoate, tin(II) ethylhexoate and tin(II) taurate, and the dialkyltin(IV) salts of mineral acids or organic carboxylic acids, e.g. dibutyltin diacetate, dibutyltin dilaurate, dibutyltin maleate, dioctyltin diacetate and dibutyltin dichloride. In addition, sulfur-containing compounds, such as di-n-octyltin mercaptide (U.S. Pat. No. 3,645,927) can also be used.

Catalysts which particularly catalyze the trimerization of NCO groups are employed for the preparation of polyurethane materials having high contents of so-called poly(isocyanurate) structures ("PIR foams"). Formulations having significant excesses of NCO groups compared with OH groups are used for the preparation of such materials. PIR foams are prepared with isocyanate indices of from 180 to 450, the characteristic index being defined as the ratio of isocyanate groups to hydroxyl groups multiplied by the factor of 100. Catalysts which contribute towards the development of isocyanurate structures are metal salts, such as, for example, potassium or sodium acetate or sodium octoate, and amino compounds, such as 1,3,5-tris(3-dimethylaminopropyl)hexahydrotriazine.

The catalysts or catalyst combinations are employed in an amount of between about 0.001 and 10 wt. %, in particular 0.01 to 4 wt. %, based on the total amount of compounds having at least two hydrogen atoms which are reactive towards isocyanates.

In the absence of moisture and blowing agents having a physical or chemical action, compact polyurethane materials, e.g. polyurethane elastomers or polyurethane cast elastomers, can also be prepared.

Additives E can optionally be co-used in the preparation of the compact or foamed polyurethane materials. Examples which may be mentioned are surface-active additives, such as emulsifiers, foam stabilizers, cell regulators, flameproofing agents, nucleating agents, antioxidants, stabilizers, lubricants and mold release agents, dyestuffs, dispersing aids and pigments. Possible emulsifiers are e.g. the sodium salts of castor oil sulfonates or salts of fatty acids with amines, such as oleic acid diethylamine or stearic acid diethanolamine. Alkali metal or ammonium salts of sulfonic acids, such as, for example, of dodecylbenzenesulfonic acid or dinaphthylmethanedisulfonic acid, or of fatty acids, such as ricinoleic acid, or of polymeric fatty acids can also be co-used as surface-active additives. Possible foam stabilizers are, above all, polyether-siloxanes. These compounds are in general built up such that copolymers of ethylene oxide and propylene oxide are bonded to a polydimethylsiloxane radical. Such foam stabilizers may be reactive towards isocyanates or unreactive towards isocyanates due to etherification of the terminal OH groups. They are described e.g. in U.S. Pat. Nos. 2,834,748, 2,917,480 and 3,629,308. General structures of such foam stabilizers are shown in G. Oertel (ed.): "Kunststoff-Handbuch", volume VII, Carl-Hanser-Verlag Munich, Vienna 1993, p. 113-115. Polysiloxane-polyoxyalkylene copolymers branched via allophanate groups, according to DE-A 25 58 523, are often of particular interest. Other organopolysiloxanes, oxyethylated alkylphenols, oxyethylated fatty alcohols and paraffin oils, and cell regulators, such as paraffins, fatty alcohols and dimethylpolysiloxanes, are also suitable. Oligomeric polyacrylates having polyoxyalkylene and fluoroalkane radicals as side groups are furthermore suitable for improving the emulsifying action, the dispersion of the filler, the cell structure and/or stabilization thereof. The surface-active substances are conventionally used in amounts of from 0.01 to 5 parts by wt. per 100 parts by wt. of component A. Reaction retardants, e.g. substances having an acid reaction, such as hydrochloric acid, or organic acids and acid halides, and pigments or dyestuffs and flameproofing agents known per se, e.g. tris-(chloroethyl)phosphate, tricresyl phosphate or ammonium phosphate and polyphosphate, and furthermore stabilizers against the influences of ageing and weathering, plasticizers and fungicidally and bactericidally acting substances can also be added. Further examples of surface-active additives and foam stabilizers as well as cell regulators, reaction retardants, stabilizers, flame-retardant substances, plasticizers, dyestuffs and fillers as well as fungistatically and bacteriostatically active substances which are optionally to be co-used according to the invention and details of the method of use and mode of action of these additives are described in R. Vieweg, A. Höchtlen (ed.): "Kunststoff-Handbuch", volume VII, Carl-Hanser-Verlag, Munich 1966, p. 103-113.

For preparation of the polyurethane materials, the ratio of amounts of the isocyanate groups in the polyisocyanates B to the hydrogens in components A, C, D and E which are reactive towards the isocyanates can vary widely. Ratios of from 0.7:1 to 5:1 are conventional.

The polyurethane materials can be prepared by the processes described in the literature, e.g. the one-shot or the prepolymer process, with the aid of mixing devices which are known in principle to the person skilled in the art.

EXAMPLES OF THE PREPARATION OF THE POLYETHER-ESTERS ACCORDING TO THE INVENTION

Raw Materials Employed:
Soya Oil:
Soya oil (refined, i.e. delecithinated, neutralized, decolorized and vapor-stripped), obtained from Sigma-Aldrich Chemie GmbH, Munich.
Castor Oil:
Refined castor oil (PU quality, OH number: 160 mg KOH/g, acid number max. 2 mg KOH/g, iodine number: 86 g $I_2$/100 g, water content max. 0.05%), obtained from Alberdingk Boley GmbH, Krefeld.

Preparation of Polymeric Alkoxylate 1:

1,190.2 g glycerol and 58.8 g of an aqueous KOH solution (containing 45 wt. % KOH) were brought together in a 10 liter autoclave at 60° C. Dehydration was carried out at 108° C. in vacuo, while stirring (450 rpm), until a pressure of less than 10 mbar was reached. 4,141.1 g propylene oxide were then metered in at 110° C. such that a total pressure of 3 bar was not exceeded. After an after-reaction time of 80 min at 110° C., the reaction mixture was heated thoroughly for 30 min in vacuo, at 110° C. The contents of the reactor were cooled to 80° C. and 550.8 g of an aqueous KOH solution (containing 45 wt. % KOH) were added. Dehydration was carried out in vacuo at 110° C. until a pressure of less than 10 mbar was reached. The alkaline polymer had an alkali number of 49.6 mg KOH/g and an alkoxylate content of 12.6 equivalent %.

Preparation of Polymeric Alkoxylate 2:

4,290.0 g glycerol and 15.5 g of an aqueous KOH solution (containing 45 wt. % KOH) were brought together in a 10 liter autoclave under a nitrogen atmosphere. 2,699.3 g propylene oxide were then metered in at 110° C., while stirring (450 rpm), such that a total pressure of 3 bar was not exceeded. The mixture was allowed to after-react at 115° C. for 180 min. The reaction mixture was heated thoroughly in vacuo, at 115° C., until a pressure of less than 10 mbar was reached. The alkaline polymer had an alkali number of 1 mg KOH/g and an alkoxylate content of 0.09 equivalent %.

Preparation of Polymeric Alkoxylate 3:

Prepared in accordance with the procedure for the preparation of polymeric alkoxylate 1 on the basis of the starter compound glycerol (14.0 wt. %) and propylene oxide (86.0 wt. %); alkoxylate content: 18.0 equivalent %; alkali number: 45.6 mg KOH/g.

Preparation of Polymeric Alkoxylate 4:

4,432.0 g glycerol and 142.4 g of an aqueous KOH solution (containing 45 wt. % KOH) were brought together in a 10 liter autoclave under a nitrogen atmosphere. Dehydration was carried out at 110° C. in vacuo, while stirring (450 rpm), until a pressure of less than 10 mbar was reached. 3,568.0 g propylene oxide were then metered in at 105° C. such that a total pressure of 3 bar was not exceeded. After an after-reaction time of 90 min at 110° C., the reaction mixture was heated thoroughly at 110° C. for 30 min in vacuo. The alkaline polymer had an alkali number of 7.9 mg KOH/g and an alkoxylate content of 0.8 equivalent %.

AMBOSOL 8080:

Colloidal magnesium silicate having a water content of approx. 23 wt. %, manufactured by PQ France S.A.S, Usine de Lamotte, Trosly-Breuil, France.

IRGANOX 1076:

Octadecyl 3-(3,5-di-tert-butyl-4-hydroxyphenyl)propionate from Ciba.

Example A 989.3 g glycerol, 3,101.4 g soya oil and 9.2 g imidazole were stripped with nitrogen (50 ml/min) in a 10 liter autoclave at 105° C. and a stirrer speed of 450 rpm for ½ hour. 1,923.7 g propylene oxide were then metered into the autoclave over a period of 3.57 hours at 105° C. and a stirrer speed of likewise 450 rpm. The metering was started under a pressure of 0.05 bar, towards the end of the metering phase the reactor pressure reached 2.2 bar. After an after-reaction time of 1.5 hours, the product was heated thoroughly for 0.5 hours in vacuo at 105° C. and, after cooling to 80° C., 3 g IRGANOX 1076 were added. The OH number of the product was 297.3 mg KOH/g, the alkali number was 1,211 ppm KOH and the viscosity at 25° C. was 194 mPas.

Example B 933.7 g glycerol, 3,102.6 g soya oil and 242.0 g polymeric alkoxylate 1 were stripped with nitrogen (50 ml/min) in a 10 liter autoclave at 105° C. and a stirrer speed of 450 rpm for ½ hour. 1,733.6 g propylene oxide were then metered into the autoclave over a period of 3.36 hours at 105° C. and a stirrer speed of 450 rpm. The metering was started under a pressure of 0.05 bar, towards the end of the metering phase the reactor pressure reached 2.5 bar. After an after-reaction time of 2.43 hours, the product was heated thoroughly for 0.5 hour in vacuo at 105° C. and, after cooling to 40° C., 120 g AMBOSOL 8080 were added and the suspension formed was stirred for 1 hour. After filtration, 3 g IRGANOX 1076 were added. The product was then heated thoroughly for a further 3 hours at 110° C. and under 1 mbar. The OH number of the product was 309 mg KOH/g, the acid number was 44.6 ppm KOH and the viscosity at 25° C. was 204 mPas.

Example C 986.3 g glycerol, 3,105.6 g soya oil and 26.8 g of a 45% strength aqueous KOH solution were dehydrated in a 10 liter autoclave at 110° C., a stirrer speed of 450 rpm and a pressure of 0.05 bar for 4 hours in vacuo. 1,914.8 g propylene oxide were then metered into the autoclave over a period of 3.15 hours at 105° C. and a stirrer speed of 450 rpm. The metering was started under a pressure of 0.05 bar, towards the end of the metering phase the reactor pressure reached 2.8 bar. After an after-reaction time of 6.27 hours, the product was heated thoroughly for 0.5 hour in vacuo at 105° C. and, after cooling to 40° C., 120 g AMBOSOL 8080 were added and the suspension formed was stirred for 1 hour. After filtration, 3 g IRGANOX 1076 were added. The product was then heated thoroughly for a further 3 hours at 110° C. and under 1 mbar. The OH number of the product was 296 mg KOH/g, the acid number was 48.3 ppm KOH and the viscosity at 25° C. was 191 mPas.

Example D 1,434.8 g trimethylolpropane, 3,102.0 g soya oil and 9.0 g imidazole were stripped with nitrogen (50 ml/min) in a 10 liter autoclave at 105° C. and a stirrer speed of 450 rpm for ½ hour. 1,466.3 g propylene oxide were then metered into the autoclave over a period of 3.28 hours at 105° C. and a stirrer speed of 450 rpm. The metering was started under a pressure of 0.05 bar, towards the end of the metering phase the reactor pressure reached 1.44 bar. After an after-reaction time of 2.0 hours, the product was heated thoroughly for 0.5 hour in vacuo at 105° C. and, after cooling to 80° C., 3.1 g IRGANOX 1076 were added. The OH number of the product was 298 mg KOH/g, the alkali number was 1,140 ppm KOH and the viscosity at 25° C. was 259 mPas.

Example E 325.2 g of a 70 wt. % strength solution of sorbitol in water were heated thoroughly at 125° C. in a 2 liter autoclave for 3 hours at a stirrer speed of 450 rpm, a constant end pressure of 10 mbar being established. 361.7 g soya oil and 1.81 g imidazole were added at room temperature under a nitrogen atmosphere. After renewed evacuation to 0.05 bar and after heating up to 105° C., a stirrer speed of 1,000 rpm was established. 962.3 g propylene oxide were metered in over a period of 4.72 hours such that the reactor pressure varied between 3.5 bar and 4 bar. After an after-reaction time of 3.0 hours, the product was heated thoroughly for 0.5 hour in vacuo at 110° C. and, after cooling to 80° C., 0.59 g IRGANOX 1076 were added. The OH number of the product was 351 mg KOH/g and the viscosity at 25° C. was 3,700 mPas.

Example F 633.0 g glycerol, 2,245.3 g soya oil and 9.2 g imidazole were stripped with nitrogen (50 ml/min) in a 10 liter autoclave at 105° C. and a stirrer speed of 450 rpm for ½ hour. Thereafter, 948.7 g sucrose were added under a nitrogen atmosphere at room temperature. After heating up to 105° C., 2,167.5 g propylene oxide were metered into the autoclave over a period of 8.35 hours at a stirrer speed again of 450 rpm. The metering was started under a pressure of 0.05 bar, the maximum reactor pressure was 3.5 bar. After an after-reaction time of 1.63 hours, the product was heated thoroughly for 0.5 h in vacuo at 105° C. and, after cooling to 80° C., 3.0 g IRGANOX 1076 were added. The OH number of the product was 401 mg KOH/g, the alkali number was 1,207 ppm KOH and the viscosity at 25° C. was 2,830 mPas.

Example G 870.7 g sucrose, 2,058.1 g soya oil, 148.7 g polymeric alkoxylate 1 and 884.4 g polymeric alkoxylate 2 were mixed in a 10 liter autoclave at 50° C. and a stirrer speed of 200 rpm under a nitrogen atmosphere. After increasing the stirrer speed to 450 rpm and heating up to 105° C., 1,525.5 g propylene oxide were metered into the autoclave over a period of 3.15 hours. The metering was started under a pressure of 0.05 bar and was carried out such that a reactor pressure of 5 bar was not exceeded. After an after-reaction time of 5.5 hours, the product was heated thoroughly for 0.5 hour in vacuo at 105° C., after cooling to 47° C. 19.85 g 88% strength lactic acid were added and the mixture was stirred for 0.5 hour. Finally, 3 g IRGANOX 1076 were added and the mixture was stirred for 0.5 hour. The OH number of the product was 402.2 mg KOH/g, the acid number was 610 ppm KOH and the viscosity at 25° C. was 2,710 mPas.

Example H 632.8 g glycerol were stripped with nitrogen (50 ml/min) in a 10 liter autoclave at 105° C. and a stirrer speed of 450 rpm for ½ hour. Thereafter, 2,242.6 g castor oil, 9.1 g imidazole and 948.8 g sucrose were added under a nitrogen atmosphere at room temperature. After heating up to 105° C., 2,167.5 g propylene oxide were metered into the autoclave over a period of 3.12 hours at a stirrer speed again of 450 rpm. The metering was started under a pressure of 0.05 bar, the maximum reactor pressure was 5.4 bar. After an after-reaction time of 2.75 hours, the product was heated thoroughly for 0.5 hours in vacuo at 105° C. and, after cooling to 80° C., 3.0 g IRGANOX 1076 were added. The OH number of the product was 459.6 mg KOH/g and the viscosity at 25° C. was 8,260 mPas.

Example I 267.2 g castor oil and 5.73 g KOH were stripped with nitrogen (50 ml/min) in a 2 liter autoclave at 110° C. and a stirrer speed of 450 rpm. 747.3 g propylene oxide were then metered into the autoclave over a period of 3.3 hours at 110° C. and a stirrer speed of 450 rpm. The metering of the propylene oxide was started under a pressure of 0.05 bar and was carried out such that a reactor pressure of 4 bar was not exceeded. After an after-reaction time of 4 hours, a nitrogen pressure of 1 bar was established and 186.8 g ethylene oxide were metered in over a period of 1.18 hours, a maximum reactor pressure of 2.5 bar being reached. After an after-reaction time of 1 hour, the contents of the reactor were cooled to 40° C. and neutralized by addition of 132 g distilled water and 32.4 g of 11.85 wt. % strength sulfuric acid. After addition of 0.65 g IRGANOX 1076, dehydration was carried out at 40° C. in vacuo and the mixture was heated thoroughly for 3 hours at 110° C. and then filtered. The OH number of the product was 51.7 mg KOH/g, the acid number was 2.01 mg KOH/g and the viscosity at 25° C. was 500 mPas. The polyol developed clouding on storage overnight at room temperature.

Example J 395.5 g polymeric alkoxylate 3 were initially introduced into a 10 liter autoclave under a nitrogen atmosphere and, after evacuation to 0.05 bar, were heated up to 110° C., while stirring (450 rpm). 20 g propylene oxide were then metered into the autoclave over a period of 4 min. After an after-reaction time of 5 min, the mixture was cooled to 80° C., the vacuum was broken with nitrogen and 1,329.1 g castor oil were added under a nitrogen atmosphere. After renewed evacuation to 0.05 bar, the mixture was heated up again to 110° C., and 3,333.7 g propylene oxide were metered into the reactor at a stirrer speed again of 450 rpm over a period of 6.9 hours. During this procedure, a maximum reactor pressure of 3.8 bar was reached. After an after-reaction time of 6 hours, 934.2 g ethylene oxide were metered in over a period of 2.12 hours, a maximum reactor pressure of 2.5 bar being reached. The mixture was allowed to after-react for 1.6 hours and was finally heated thoroughly for 30 min at 110° C. The contents of the reactor were cooled to 90° C. and neutralized by addition of 600 g distilled water and 124.6 g of 11.98 wt. % strength sulfuric acid. After addition of 3.08 g IRGANOX 1076, dehydration was carried out at 110° C. in vacuo until a pressure of 0.1 mbar was reached and the mixture was finally filtered. The OH number of the product was 61.3 mg KOH/g, the acid number was 1.5 mg KOH/g and the viscosity at 25° C. was 510 mPas. The polyol developed a clouding on storage overnight at room temperature.

Example K 395.3 g polymeric alkoxylate 3 were initially introduced into a 10 liter autoclave under a nitrogen atmosphere and, after evacuation to 0.05 bar, were heated up to 110° C., while stirring (450 rpm). 20 g propylene oxide were then metered into the autoclave over a period of 5 min. After an after-reaction time of 5 min, the mixture was cooled to 80° C., the vacuum was broken with nitrogen and 1,329.3 g castor oil were added under a nitrogen atmosphere. After renewed evacuation to 0.05 bar, the mixture was heated up again to 110° C., and 3,333.8 g propylene oxide were metered into the reactor at a stirrer speed again of 450 rpm over a period of 8.1 hours. During this procedure, a maximum reactor pressure of 3.8 bar was reached. After an after-reaction time of 4.8 hours, 934.3 g ethylene oxide were metered in over a period of 1.8 hours, a maximum reactor pressure of 2.6 bar being reached. The mixture was allowed to after-react for 1.6 hours and was finally heated thoroughly for 30 min at 110° C. The contents of the reactor were cooled to 40° C. and neutralized by addition of a mixture of 600 g distilled water and 131.7 g of 11.98 wt. % strength sulfuric acid. After addition of 3.02 g IRGANOX 1076, dehydration was carried out at 110° C. in vacuo until a pressure of 0.1 mbar was reached and the mixture was finally filtered. The OH number of the product was 60.4 mg KOH/g, the acid number was 0.56 mg KOH/g and the viscosity at 25° C. was 500 mPas. The polyol remained clear on storage at room temperature over a period of at least 2 months.

The analytical results of the polyether-esters obtained according to Examples I, J and K are compared with one another in the following Table I.

TABLE I

|  | Example I | Example J | Example K |
| --- | --- | --- | --- |
| Castor oil content [%] | 22 | 22 | 22 |
| Calculated OH number [mg KOH/g] | 35 | 51.7 | 51.7 |
| OH number found [mg KOH/g] | 51.7 | 61.3 | 60.4 |
| Deviation of the OH number found from the calculated [%] | 48 | 19 | 17 |
| Acid number [ppm KOH] | 2,010 | 1,500 | 560 |
| $M_w/M_n$ |  | 1.48 | 1.35 | 1.28 |
| Appearance at room temperature | cloudy | cloudy | clear |

A comparison of Examples I and J in Table I above shows that in the preparation of ethers having low OH numbers, the reaction mixture should preferably be freed from traces of water before contact of the fatty acid ester with the basic catalyst. A comparison of Examples J and K in Table I above illustrates the advantage of gentle working up conditions if strong dilute mineral acids are employed in the neutralization.

Example L 1,422 g sucrose, 3,365 g soya oil and 1,702 g polymeric alkoxylate 4 were mixed in a 27 liter autoclave under a nitrogen atmosphere. After heating up to 105° C., 900 g ethylene oxide were metered into the autoclave over a period of 65 minutes at 105° C. The reaction mixture was after-reacted at 105° C., until no further change in pressure was to be observed. The product was then heated thoroughly under reduced pressure at 110° C. and 1,630 g propylene oxide were then metered into the autoclave at 105° C. over a period of 172 minutes. The reaction mixture was then after-reacted at 105° C. until no further change in pressure was observed. After cooling to 90° C., the product was neutralized with lactic acid. After heating thoroughly under reduced pressure at 110° C., 500 ppm IRGANOX 1076 were added to the product. The OH number of the product was 388.5 mg KOH/g, the acid number was 145 ppm KOH, the water content was 380 ppm, the Gardner color number was 3 and the viscosity at 25° C. was 2,276 mPas. A functionality of 3.5 was calculated for the product.

It is found that it is advantageous first to alkoxylate with ethylene oxide, because the primary OH groups formed assist the incorporation of sucrose into the polyol. No deposition of residual amounts of sucrose from the product, as sometimes occurs if exclusively propylene oxide is employed, is thus observed.

Example M 1,002 g sucrose, 2,005 g soya oil, 905 g glycerol and 11.2 g N-methylimidazole were mixed in a 27 liter autoclave under a nitrogen atmosphere. After heating up to 107° C., 3,500 g propylene oxide were metered into the autoclave over a period of 445 minutes at 107° C. The reaction mixture was after-reacted at 107° C. until no further change in pressure was observed. The product was then heated thoroughly under reduced pressure at 110° C. and subsequently cooled. A dark-colored clear liquid was obtained. The OH number of the product was 389 mg KOH/g, the water content was 100 ppm, the Gardner color number was 16 and the viscosity at 25° C. was 1,775 mPas. A functionality of 3.5 was calculated for the product.

Example N 1,000 g sucrose, 2,002 g soya oil, 911 g glycerol and 11,15 g imidazole were mixed in a 27 liter autoclave under a nitrogen atmosphere. After heating up to 107° C., 3,500 g propylene oxide were metered into the autoclave over a period of 517 minutes at 107° C. The reaction mixture was after-reacted at 107° C. until no further change in pressure was observed. The product was then heated thoroughly under reduced pressure at 110° C. and subsequently cooled. A very dark reddish-colored clear liquid was obtained. The OH number of the product was 391.6 mg KOH/g, the water content was 90 ppm, the Gardner color number was >16 and the viscosity at 25° C. was 1,852 mPas. A functionality of 3.5 was calculated for the product.

A comparison of Examples M and N shows that the use of imidazole as a catalyst leads to a very dark-colored product. A considerably lighter-colored product is obtained with N-methylimidazole.

Examples of the Foaming of the Polyether-Esters According to the Invention

Raw Materials Employed:
Polyol A:
  Polyether polyol based on propylene oxide; starter compounds: sucrose, ethylene glycol, propylene glycol; OH number 450 mg KOH/g; number-average functionality: 4.7
Polyol B:
  Polyether polyol based on propylene oxide; starter compound: o-toluenediamine, OH number: 400 mg KOH/g
Polyol C:
  Polyether polyol based on propylene oxide; starter compound: ethylenediamine, OH number: 470 mg KOH/g
Polyol D:
  Polyether polyol based on propylene oxide; starter compound: propylene glycol, OH number: 112 mg KOH/g
Catalyst A:
  Pentamethyldipropylenediamine
Catalyst B:
  2,4,6-Tris[3 (dimethylamino)propyl]s-hexahydrotriazine
Catalyst C:
  N,N-dimethylcyclohexylamine
B 8461 and B 8465:
  Foam stabilizers based on polyether-polysiloxanes; Goldschmidt AG, 45127 Essen Preparation of the Polyol Component:
  Polyols and additives were mixed according to the amounts stated (parts by weight) in Table II below. The mixtures were evaluated in respect of their phase behavior.

TABLE II

|  | C-1 | 2 | 3 | 4 | 5 |
| --- | --- | --- | --- | --- | --- |
| Polyol A | 65 | — | — | — | — |
| Polyether-ester from Ex. E | — | 65 | — | — | — |

TABLE II-continued

| | | | | | |
|---|---|---|---|---|---|
| Polyether-ester from Ex. F | — | — | 65 | — | — |
| Polyether-ester from Ex. G | — | — | — | 65 | — |
| Polyether-ester from Ex. H | — | — | — | — | 65 |
| Polyol B | 10 | 10 | 10 | 10 | 10 |
| Polyol C | 15 | 15 | 15 | 15 | 15 |
| Polyol D | 10 | 10 | 10 | 10 | 10 |
| Water | 2.4 | 2.4 | 2.4 | 2.4 | 2.4 |
| B 8461 | 2 | 2 | 2 | 2 | 2 |
| Catalyst A | 0.4 | 0.4 | 0.4 | 0.4 | 0.4 |
| Catalyst B | 0.4 | 0.4 | 0.4 | 0.4 | 0.4 |
| Catalyst C | 1.05 | 1.05 | 1.05 | 1.05 | 1.05 |
| Phase behavior | homogeneous | homogeneous | homogeneous | homogeneous | homogeneous |

| | C-6 | 7 | 8 | C-9 | C-10 |
|---|---|---|---|---|---|
| Polyol A | 65 | 55 | 47 | 41 | 41 |
| Polyether-ester from Ex. F | — | 10 | 16 | — | — |
| Castor oil | — | — | — | — | 24 |
| Soya oil | — | — | — | 24 | — |
| Polyol B | 10 | 10 | 11 | 10 | 10 |
| Polyol C | 15 | 15 | 15 | 15 | 15 |
| Polyol D | 10 | 10 | 11 | 10 | 10 |
| Water | 2.4 | 2.4 | 2.5 | 2.4 | 2.4 |
| B 8461 | — | — | — | 2 | 2 |
| B 8465 | 2 | 2 | 2.1 | — | — |
| Catalyst A | 0.4 | 0.4 | 0.4 | 0.4 | 0.4 |
| Catalyst B | 0.4 | 0.4 | 0.4 | 0.4 | 0.4 |
| Catalyst C | 1.05 | 1.05 | 1.1 | 1.05 | 1.05 |
| Phase behavior | homogeneous | homogeneous | homogeneous | 2 phases | homogeneous |

In each case 100 parts by weight of the homogeneous polyol mixtures from Tables II were stirred with a blowing agent mixture of cyclopentane and isopentane in the ratio of 7:3 at 20° C. The minimum weight ratios of blowing agent to polyol mixture at which clouding is to be observed are stated in Table III. In the case of blowing agent solubilities of more than 30 parts by weight of blowing agent in 100 parts of polyol formulation, detailed analyses were omitted.

TABLE III

| | Blowing agent mixture with polyol mixture according to example | | | | |
|---|---|---|---|---|---|
| | C-1 | 2 | 3 | 4 | 5 |
| Onset of clouding when blowing agent/polyol ratio exceeds | 17/100 | >30/100 | >30/100 | >30/100 | >30/100 |

| | Blowing agent mixture with polyol mixture according to example | | | |
|---|---|---|---|---|
| | C-6 | 7 | 8 | C-10 |
| Onset of clouding when blowing agent/polyol ratio exceeds | 13/100 | 16/100 | 19/100 | 11/100 |

The examples in Tables II and III show that if polyols which are not according to the invention are used as formulation components, significantly reduced blowing agent solubilities are observed. Significant improvements in the blowing agent solubilities can be achieved by addition of small amounts of the polyether-esters according to the invention. Surprisingly, such an effect is not established if physical mixtures of triglyceride and polyols which are not according to the invention are used.

Foaming Examples 100 parts by weight of polyol mixed with 14 parts by weight of blowing agent were stirred with DESMODUR 44 V 20 L (Bayer MaterialScience AG; polymeric MDI having an isocyanate content of 31.5 wt. %) in accordance with the amounts stated in Tables IV below at 4,200 rpm for 6-8 s. The isocyanate index was 110 in all cases. Molds of dimensions 22 cm×22 cm×10 cm or 22 cm×22 cm×6 cm were filled with the reaction mixture in the bulk densities stated in Table IV. The bulk densities chosen were 10% higher than the separately determined minimum filling bulk densities. The foamed bodies produced in the 10 cm thick mold were removed from the mold after a mold dwell time of 5 min, and their after-swelling was determined 30 min after removal from the mold. Test specimens of dimensions 20 cm×20 cm×3 cm were obtained from the foamed bodies produced in the 6 cm thick molds for determination of the thermal conductivities. The thermal conductivities were determined 2 hours after production of the foams at a foam middle temperature of 23° C.

TABLE IV

| | Blowing agent mixture with polyol mixture from example | | | | |
|---|---|---|---|---|---|
| | C-1 | 2 | 3 | 4 | 5 |
| DESMODUR 44 V 20 L [pt. by wt.] | 140 | 124 | 132 | 132 | 140 |
| Filling bulk density 10 cm thick mold [kg/m³] | 33.8 | 32.1 | 33.8 | 34.2 | 35.5 |
| Filling bulk density 6 cm thick mold [kg/m³] | 36.6 | 34.7 | 34.7 | 34.7 | 35.9 |
| After-swelling [mm] | 0.5 | 2.1 | 1.4 | 5.4 | 1.5 |
| Thermal conductivity [mW/mK] | 22.6 | 22.8 | 23.5 | 23.7 | 22.6 |

| | Blowing agent mixture with polyol mixture from example | | | |
|---|---|---|---|---|
| | C-6 | 7 | 8 | C-10 |
| DESMODUR 44 V 20 L [pt. by wt.] | 140 | 138 | 139 | 124 |
| Filling bulk density 10 cm thick mold [kg/m³] | — | — | 33.8 | 33.2 |
| Filling bulk density 6 cm thick mold [kg/m³] | 34.2 | 34.3 | 34.5 | 33.4 |
| After-swelling [mm] | — | — | — | 1.9 |
| Thermal conductivity [mW/mK] | 22.6 | 22.6 | 22.6 | 23.2 |

The examples in Table IV show that low after-swelling of shaped bodies is ensured even at short mould dwell times if polyol formulations which comprise large amounts of polyether-ester polyols according to the invention prepared under amine catalysis are employed.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

The invention claimed is:

1. A one pot, one step process for the preparation of a polyether-ester polyol comprising reacting one or more starter compounds having Zerewitinoff-active hydrogen atoms with one or more alkylene oxides in the presence of an amine catalyst that is employed in an amount of 200 ppm to 10,000 ppm, based on the amount of end product of the process and in the presence of one or more fatty acid esters having fatty acid radicals that contain no free OH groups to produce a polyether-ester polyol, with the proviso that the process does not use a salt of an alkali metal or alkaline earth metal as a catalyst to produce the polyether-ester polyol.

2. The process according to claim 1, wherein the fatty acid ester comprises about 5 to about 85 wt. %, based on the amount of end product of the process.

3. The process according to claim 1, wherein the fatty acid ester is produced from one of auric acid, myristic acid, palmitic acid, stearic acid, palmitoleic acid, oleic acid, erucic acid, linoleic acid, Underlie acid, elaeostearic acid, arachidonic acid and mixtures thereof.

4. The process according to claim 1, wherein the starter compound is selected from propylene glycol, ethylene glycol, diethylene glycol, dipropylene glycol, 1,2-butanediol, 1,3-butanediol, 1,4-butane diol, hexanediol, pentanediol, 3-methyl-1,5-pentanediol, 1,12-dodecanediol, glycerol, trimethylolpropane, trimethylolethane, triethanolamine, pentaerythritol, sorbitol, sucrose, α-methyl glucoside, fructose, hydroquinone, pyrocatechol, resorcinol, bisphenol F, bisphenol A, 1,3,5-trihydroxybenzene, condensates of formaldehyde and phenol or melamine or urea containing methylol groups, Mannich bases, ammonia, ethanolamine, diethanolamine, isopropanolamine, diisopropanolamine, ethylenediamine, hexamethylenediamine, aniline, isomers of toluidine, isomers of diaminotoluene, and isomers of diaminodiphenylmethane.

5. The process of claim 1, wherein the amine catalyst is an aliphatic amine or alkanolamine comprising N,N-dimethylbenzylamine, dimethylaminoethanol, dimethylaminopropanol, N-methyldiethanolamine, trimethylamine, N,N-dimethylcyclohexylamine, N-methylpyrrolidine, N,N,N',N'-tetramethylethylenediamine, diazabicyclo[2,2,2]octane, 1,4, dimethylpiperazine or N-methylmorpholine.

6. The process of claim 1, wherein the amine catalyst comprises an aromatic amine comprising imidazole, an alkyl-substituted imidazole, N,N-dimethylaniline, 4-(N,N-dimethyl)aminopyridine, a copolymer of (i) 4-vinylpyridine or vinylimidazole, and (ii) divinylbenzene.

7. A polyether-ester polyol produced by a one pot, one step process comprising reacting one or more starter compounds having Zerewitinoff-active hydrogen atoms with one or more alkylene oxides in the presence of an amine catalyst that is employed in an amount of 200 ppm to 10,000 ppm, based on the amount of end product of the process and in the presence of one or more fatty acid esters having fatty acid radicals that contain no free OH groups, with the proviso that the process does not use a salt of an alkali metal or alkaline earth metal as a catalyst to produce the polyether-ester polyol.

8. The polyether-ester polyol of claim 7, wherein the amine catalyst is an aliphatic amine or alkanolamine comprising N,N-dimethylbenzylamine, dimethylaminoethanol, dimethylaminopropanol, N-methyldiethanolamine, trimethylamine, N,N-dimethylcyclohexylamine, N-methylpyrrolidine, N,N,N',N'-tetramethylethylenediamine, diazabicyclo[2,2,2]octane, 1,4,dimethylpiperazine or N-methylmorpholine.

9. The polyether-ester polyol of claim 7, wherein the amine catalyst comprises an aromatic amine comprising imidazole, an alkyl-substituted imidazole, N,N-dimethylaniline, 4-(N,N-dimethyl)aminopyridine, a copolymer of (i) 4-vinylpyridine or vinylimidazole, and (ii) divinylbenzene.

10. A process for the preparation of a polyurethane foam or elastomer comprising reacting a polyisocyanate with the polyether-ester polyol according to claim 7.

11. A process for the preparation of a polyurethane foam or elastomer comprising reacting a polyisocyanate with a polyether-ester polyol produced by a one pot, one step process comprising reacting one or more starter compounds having Zerewitinoff-active hydrogen atoms with one or more alkylene oxides in the presence of an amine catalyst and in the presence of one or more fatty acid esters having fatty acid radicals that contain no free OH groups, with the proviso that the polyether-ester polyol is produced by a process that does not use a salt of an alkali metal or alkaline earth metal as a catalyst to produce the polyether-ester polyol.

12. The process according to claim 11, wherein the polyisocyanate is selected from ethylene-diisocyanate, 1,4-tetramethylene-diisocyanate, 1,6-hexamethylene-diisocyanate (HDI), 1,12-dodecane-diisocyanate, cyclobutane-1,3-diisocyanate, cyclohexane-1,3- and -1,4-diisocyanate and mixtures thereof, 1-isocyanato-3,3,5-trimethyl-5-isocyanatomethyl-cyclohexane, 2,4- and 2,6-hexahydrotoluylene-diisocyanate and mixtures thereof, hexahydro-1,3- and -1,4-phenylene-diisocyanate, perhydro-2,4'- and -4,4'-diphenylmethane-diisocyanate, 1,3- and 1,4-phenylene-diisocyanate, 1,4-durol-diisocyanate (DDI), 4,4'-stilbene-diisocyanate, 3,3'-dimethyl-4,4'-biphenylene-diisocyanate (DIBDI), 2,4- and 2,6-toluylene-diisocyanate (TD) and mixtures thereof, diphenylmethane-2,4'-diisocyanate and/or diphenylmethane-4,4'-diisocyanate (MDI) and naphthylene-1,5-diisocyanate (NDI).

13. The process according to claim 11, wherein the fatty acid ester is produced from one of lauric acid, myristic acid, palmitic acid, stearic acid, palmitoleic acid, oleic acid, erucic acid, linoleic acid, linolenic acid, elaeostearic acid, arachidonic acid and mixtures thereof.

14. The process according to claim 11, wherein the starter compound is selected from propylene glycol, ethylene glycol, diethylene glycol, dipropylene glycol, 1,2-butanediol, 1,3-butanediol, 1,4-butanediol, hexanediol, pentanediol, 3-methyl-1,5-pentanediol, 1,12-dodecanediol, glycerol, trimethylolpropane, trimethylolethane, triethanolamine, pentaerythritol; sorbitol, sucrose, α-methyl glucoside, fructose, hydroquinone, pyrocatechol, resorcinol, bisphenol F, bisphenol A, 1,3,5-trihydroxybenzene, condensates of formaldehyde and phenol or melamine or urea containing methylol groups, Mannich bases, ammonia, ethanolamine, diethanolamine, isopropanolamine, diisopropanolamine, ethylenediamine, hexamethylenediamine, aniline, isomers of toluidine, isomers of diaminotoluene, and isomers of diaminodiphenylmethane.

15. The process of claim 11, wherein the amine catalyst is an aliphatic amine or alkanolamine comprising N,N-dimethylbenzylamine, dimethylaminoethanol, dimethylaminopropanol, N-methyldiethanolamine, trimethylamine, N,N-dimethylcyclohexylamine, N-methylpyrrolidine, N,N,N',N'-tetramethylethylenediamine, diazabicyclo[2,2,2]octane, 1,4, dimethylpiperazine or N-methylmorpholine.

16. The process of claim 11, wherein the amine catalyst comprises an aromatic amine comprising imidazole, an alkyl-substituted imidazole derivative, N,N-dimethylaniline, 4-(N, N-dimethyl)aminopyridine, a copolymer of (i) 4-vinylpyridine or vinylimidazole, and (ii) divinylbenzene.

17. The polyurethane foam or elastomer made by the process according to claim 11.

\* \* \* \* \*